(12) United States Patent
Immel

(10) Patent No.: US 6,595,005 B1
(45) Date of Patent: Jul. 22, 2003

(54) METHOD AND APPARATUS FOR MEASURING COOLING EFFICACY OF A FLUID MEDIUM

(75) Inventor: Eric Immel, West Linn, OR (US)

(73) Assignee: InFocus Corporation, Wilsonville, OR (US)

( * ) Notice: Subject to any disclaimer, the term of this patent is extended or adjusted under 35 U.S.C. 154(b) by 11 days.

(21) Appl. No.: 09/677,400

(22) Filed: Sep. 29, 2000

(51) Int. Cl.$^7$ .............................. G01N 25/20; F28F 7/00
(52) U.S. Cl. ...................... 62/3.7; 62/259.2; 165/80.2; 374/43
(58) Field of Search .................. 374/43; 62/3.7, 62/259.2; 236/49.3; 165/80.2

(56) References Cited

U.S. PATENT DOCUMENTS

| | | | |
|---|---|---|---|
| 3,474,963 A | * 10/1969 | Buiting et al. | 236/68 B |
| 4,669,025 A | * 5/1987 | Barker, III et al. | 361/103 |
| 5,195,827 A | 3/1993 | Audy et al. | 374/172 |
| 6,006,168 A | 12/1999 | Schumann et al. | 702/132 |
| 6,203,191 B1 | * 3/2001 | Mongan | 374/43 |

FOREIGN PATENT DOCUMENTS

| | | |
|---|---|---|
| EP | 03025458 | 4/1991 |
| EP | 03008070 | 7/1992 |

OTHER PUBLICATIONS

Specification for Airflow and Temperature Sensor (TMP12), Analog Devices, Inc. 1995, pps. 1–14.

* cited by examiner

*Primary Examiner*—William Wayner
(74) *Attorney, Agent, or Firm*—Blakely Sokoloff Taylor & Zafman LLP

(57) ABSTRACT

A method and apparatus for measuring the cooling efficacy of air comprising coupling a resistive element to a temperature sensing element, applying a voltage across the resistive element, adjusting the voltage across the resistive element so that the temperature indicated by the temperature sensing element is nearly proportional to the temperature of a locally disposed heat sensitive component for a change in environmental parameters, and coupling the output of the temperature sensing element to a control circuit wherein the control circuit controls a space cooling element.

52 Claims, 2 Drawing Sheets

METHOD AND APPARATUS FOR MEASURING COOLING EFFICACY OF A FLUID MEDIUM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the field of thermal management. In particular, the present invention is related to a method and apparatus for measuring cooling efficacy of a fluid medium.

2. Description of the Related Art

Power supplied to electronic equipment produces heat. Too much heat causes electronic components to deteriorate and eventually fail. Hence, some means of cooling the electronic components is necessary. Many methods and devices are employed to cool electronic components. Movement of a fluid medium, such as air, over the electronic components is one of the most common methods. Heat sinks, fans, heat exchangers, and coolant pumps are some of the most commonly used devices for facilitating the removal of heat. In a system that uses air as the cooling fluid, heat from an electronic component is transferred to the air surrounding the component. The heated air is moved away from the electronic component and is replaced by fresh air, resulting in the cooling of the electronic component.

The cooling efficacy of a fluid is a measure of how well a fluid cools a particular mass. The efficacy of a fluid depends on several parameters. The most significant of these parameters are the temperature of the fluid (air), and the quantity of the air moved over the mass. The temperature of the air commonly depends on the ambient environment. The quantity of air moved is controlled by any of several devices. Typically, these devices are fans and blowers. Thus, the quantity of air moved depends upon how fast a fan turns.

The quantity of air moved by a fan or blower also depends on the density of the air. At lower altitudes air is more dense, and therefore for a given fan speed more air is moved at lower altitudes that at higher altitudes. This means that the cooling efficacy of air depends, in part, on altitude. The simplest solution to guarantee sufficient cooling of electronic components under any conditions is to move enough air by simply running the fans at full speed. However, this mode is not efficient since more cooling effort is expended than is necessary. Also, moving air generates acoustic noise. Acoustic noise generation is undesirable especially when generated by a fan in a projector such as a movie-projector or a data-projector.

In some instances when a fan is used to cool heat sensitive electronic elements, such as to cool a lamp in a projector, using a fan controlled by a temperature sensor mounted on a circuit board is not the optimum solution. The fan speed, when controlled by a temperature sensor mounted on a circuit board, could be variable. This means that for various modes of operation, as different components on the circuit board are turned on, the variation in heat generated causes the fan speed to fluctuate. This variation in fan speed is undesirable, as a high-speed fan with continually changing speeds may generate disagreeable noise. Moreover, in the situation described above, the speed of the fan changes in response to the heat generated by components on the circuit board rather than in response to the changes in cooling efficacy of the air.

A heat sensitive element such as a lamp in a movie or data projector may be located some distance away from the circuit board. In other instances, due to the variability in the design of the circuit boards for different models of the same product, the location of the temperature sensor on the circuit board may be at varying distances away from the heat sensitive element. This variability complicates engineering predictions and increases development time.

Moreover, since air density changes with altitude, any product used to cool electronics at random altitudes most cope with this variability. This means that a cooling system that uses a temperature transducer on a circuit board for its input may not operate efficiently enough in order to cool a heat sensitive element operating at random altitudes. What is needed, therefore, is a method and apparatus to directly measure the cooling efficacy of air.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

Described is a method and apparatus to measure the cooling efficacy of a fluid (air) medium. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention.

Parts of the description will be presented using terminology commonly employed by those skilled in the art to convey the substance of their work to others skilled in the art. Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
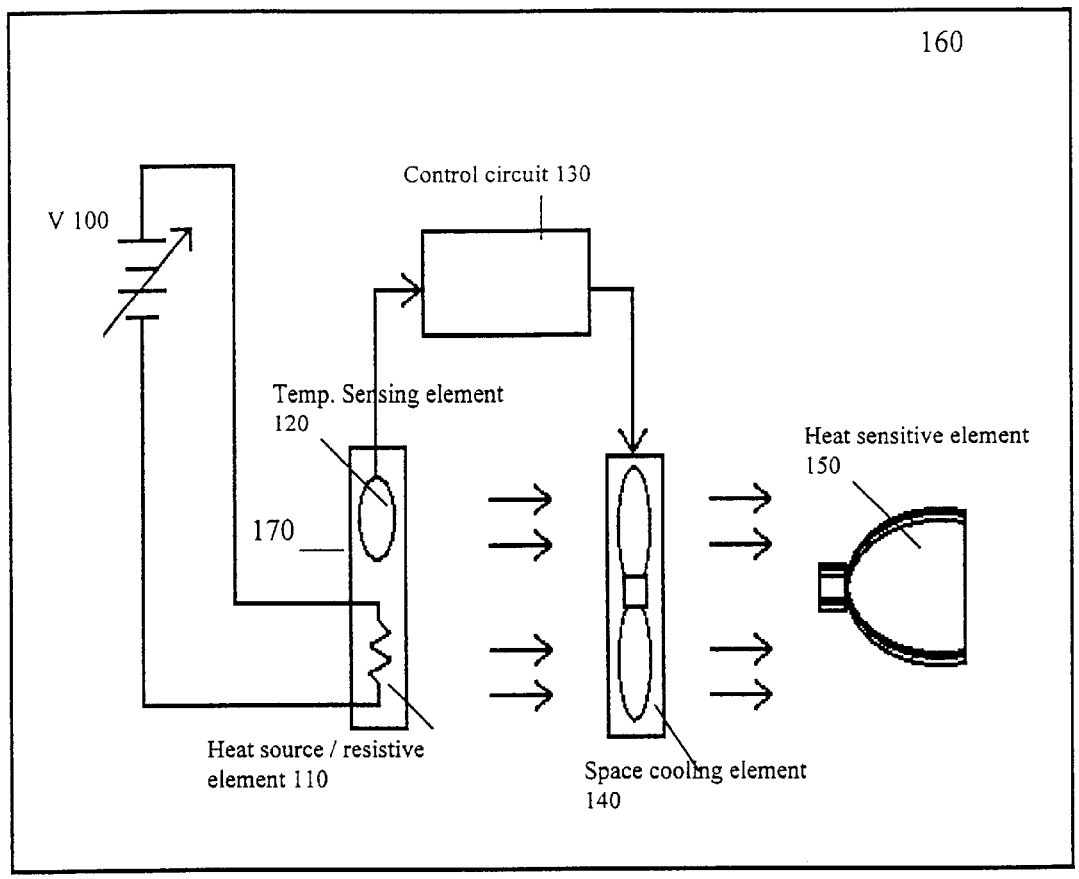
FIG. 1 illustrates an embodiment of the invention.

FIG. 1 illustrates an embodiment of the invention in apparatus 160. As shown in FIG. 1, a heat source (hereafter resistive element) 110 is coupled to a temperature sensing element 120 to form a sensor 170. It is appreciated by one skilled in the art that resistive element 110 can be any one of a number of resistive elements including but not limited to resistive elements such as carbon film resistors, metallic alloy resistors, metal oxide resistors, thick film resistors, and any active device. Likewise, temperature sensing element 120 can be any one of a number of temperature sensing elements. For example, temperature sensing element 120 may be a temperature sensing transducer such as an integrated circuit temperature sensor, thermocouple, thermistor, or platinum resistance thermometer.

In one embodiment, resistive element 110 is coupled to temperature sensing element 120 via a thermal conductor placed between the resistive element and the temperature sensing element. However, in another embodiment, the resistive element 110 is affixed to the temperature sensing element. There are various means well known in the art exist to affix the resistive element to the temperature sensing element, and are therefore not described further herein. Power-supply 100 applied across resistive element 110 can be any one of a number of power sources including but not limited to a variable voltage source, a constant voltage source, a variable current source, or a constant current source.

The output of temperature sensing element 120 of sensor 170 is coupled to a control circuit 130. Control circuit 130 is further coupled to space cooling element 140. Space cooling element 140 can be any device that removes heat from the heat sensitive element 150. In one embodiment, heat sensitive element 150 can be any heat sensitive element, such as a lamp in a movie or data projector, a motor hub, motor windings, power semiconductor device, signal processing semiconductor device, digital semiconductor device, semiconductor imaging device, optical device and touchable surface. In effect, a heat sensitive element can be any element that not only generates heat, but also, those elements that are adversely affected by elevated temperatures. In another embodiment, space cooling element 140 can be any cooling element including but not limited to a fan, blower, heat pump, coolant pump, heat exchanger, and thermoelectric cooler.

Fluid mass flow rate is defined as the amount of fluid (air) mass that passes a certain point in a certain interval of time, for example, the amount of air that crosses a particular section in an apparatus in a certain interval of time. Since the amount of air that crosses a particular section in an apparatus depends in part on altitude, an alignment procedure is performed at the time of manufacture on sensor 170 to set the sensitivity of the sensor to account for fluid mass flow rate changes that occur as a result of changes in altitude.

For the alignment procedure, the power that is applied to resistive element 110 is adjusted to set the sensitivity of the temperature sensing element 120 to track fluid mass flow rate changes within apparatus 160. In particular, the alignment procedure requires adjusting the voltage 100 such that the temperature of the resistive element 110 proportionately tracks the surface temperature of the heat sensitive element 150 as the altitude changes, keeping all parameters such as ambient temperature, air pressure, fan speed etc. constant. In one embodiment, the surface temperature of the heat sensitive element 150 is tracked by placing a temperature sensor on or near heat sensitive element 150, and by monitoring the temperature indicated by the temperature sensor. The temperature indicated by the temperature sensor placed on or near the heat sensitive element is compared with the temperature indicated by sensor 170. Once the two temperatures are nearly equal to each other, the altitude is changed, and once again the two temperatures i.e. that indicated by the temperature sensor on or near the heat sensitive element 150, and the temperature indicated by sensor 150 are compared to each other. If the two temperatures are nearly equal to each other at the new altitude, the alignment procedure is complete. If they are not, a different voltage is applied across resistive element 110, and process is repeated. Once this alignment procedure is complete, voltage 100 is fixed to the value obtained in the alignment procedure. In one embodiment, the temperature indicated by sensor 170, is equal in magnitude to the temperature of the heat sensitive element. In another embodiment, the temperature indicated by sensor 170, is proportional to the temperature of the heat sensitive element. In another embodiment, the time taken by the sensor 170 to equal the critical temperature of the heat sensitive element 150 is quicker than the time taken by the heat sensitive element to equal its critical temperature. The critical temperature of the heat sensitive element is the temperature at which the heat sensitive element is destroyed. Thus, for a constant air (fan) speed, the temperature reading output by sensor 170 increases at higher altitudes by an amount nearly proportional to the temperature increase in the heat sensitive element 150. Thus, sensor 170 simulates the thermal behavior of the heat sensitive element 150, and is adjusted to account for fluid mass flow rate changes. In other words, sensor 170 represents a thermal analog of the heat sensitive element 150.

Figure 2:
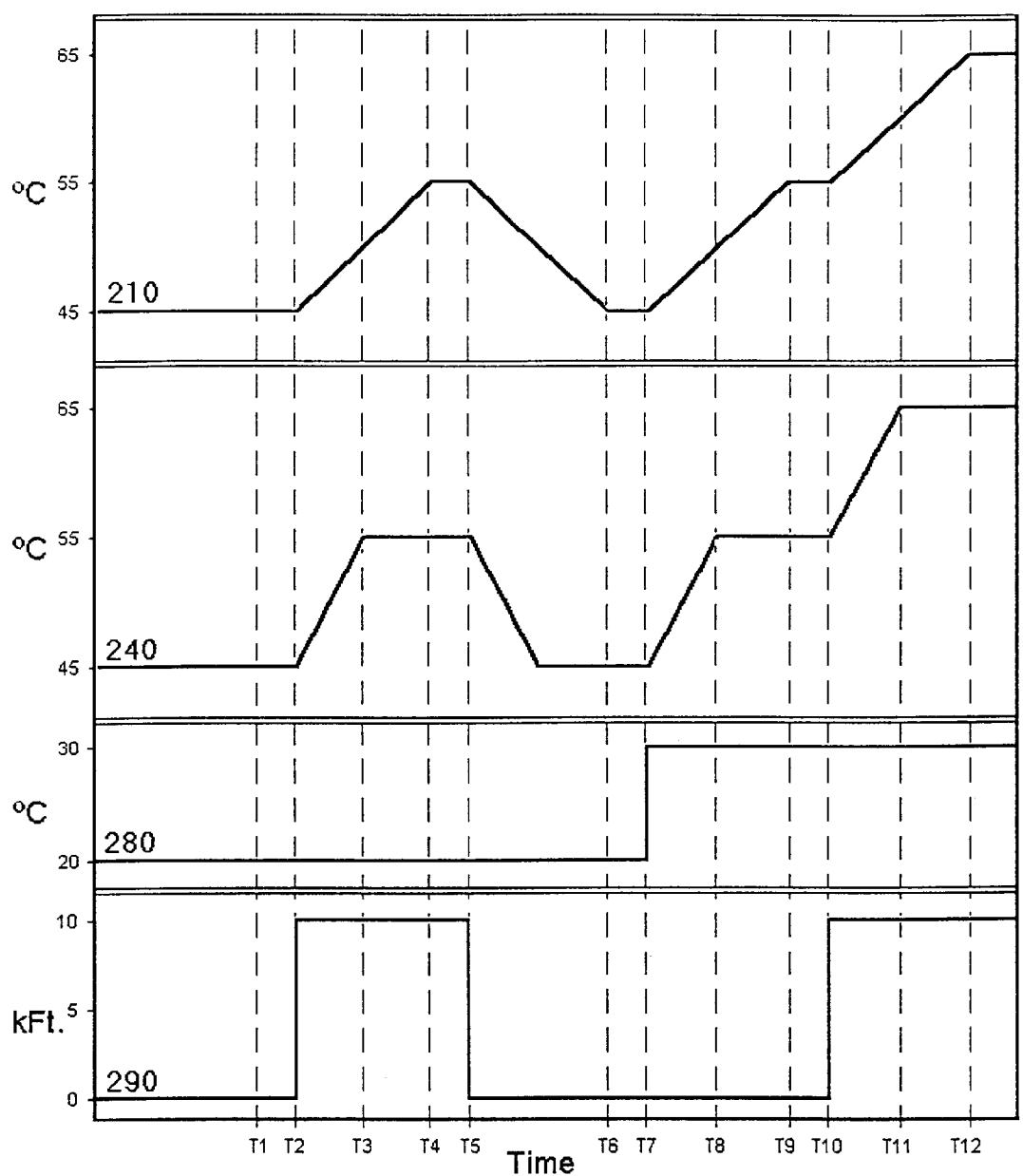
FIG. 2 is a graph that illustrates an embodiment of the invention measuring fluid efficacy for changes in altitude.

The graph illustrated in FIG. 2 is for illustrative purposes only and does not represent actual data. The graph illustrated in FIG. 2 is not to be construed as limiting the scope of the invention. FIG. 2 illustrates a graph of the temperature of heat sensitive element 150, and that of sensor 170, as a function of altitude and ambient temperature, for a fixed input voltage 100, and for a constant fan speed. The graph in FIG. 2 is plotted for the embodiment described in FIG. 1. The resistance value of resistive element 110 is fixed, and the input voltage 100 is adjusted in accordance with the alignment procedure disclosed above. The x-axis of the graph in FIG. 2 is time. The y-axis on the graph is temperature in degrees Celsius. Trace 280 is the ambient temperature, trace 210 is the surface temperature of the heat sensitive element, trace 290 is the altitude in feet, and trace 240 is the output providing the temperature of sensor 170.

In FIG. 2 at T1, which represents readings at sea level, for ambient temperature 20 C., the temperature of the heat sensitive element 150 is stable at 45 C. and the temperature detected by sensor 170 is also stable at 45 C. At T2, which represents readings for an altitude of 10,000 feet for the same ambient temperature 20 C., the temperature of the heat sensitive element slowly ramps up to 55 C. and the temperature detected by sensor 170 ramps up at a steeper rate to 55C. At T3, the temperature of sensor 170 stabilizes, while the temperature of the heat sensitive element continues to rise. At T4, the temperature of the heat sensitive element stabilizes. At T5, the altitude is at sea level one again, and at T6 both the heat sensitive element and the sensor output are stable. At T7, the ambient temperature is increased to 30 C. and the temperature of the heat sensitive element ramps slowly to 55 C. However, the temperature of sensor 170, ramps up at a steeper rate to 55 C. At T8, the temperature of the sensor 170 stabilizes, while the temperature of the heat sensitive element continues to increase. At T9, the temperature of the heat sensitive element stabilizes. At T10, the altitude is increased to 10,000 feet and the temperature of the heat sensitive element slowly ramps up to 65 C. The temperature output by sensor 170, ramps up steeply to 65 C. At T11, the temperature detected by sensor 170 stabilizes, while the temperature of the heat sensitive element continues to rise. At T12, the heat sensitive element stabilizes.

Thus, the voltage 100 has been adjusted at the time of manufacture for sensor 170 to proportionately track the changes in the surface temperature of heat sensitive element 150 as the altitude and the ambient temperature change. For the voltage value set during manufacture, during normal operation of sensor 170, the temperature reported by sensor 170, is analogous to the temperature of the heat sensitive element, since the sensor 170 reports the resultant effect of both air density and ambient air temperature. Since both the factors that affect cooling efficacy i.e. air density and ambient air temperature are accounted for by a single measurement by sensor 170, sensor 170 measures the cooling efficacy of the air within apparatus 160. The reading obtained from sensor 170, when input to control circuit 130, is used to adjust the operation of space cooling element 140 in order to maintain a constant temperature value at the surface of the heat sensitive element 150.

Since the time required for the sensor 170 to stabilize is less than the time required for the heat sensitive element 150 to stabilize, the heat sensitive element is adequately cooled by the space cooling element 140. The temperature of the heat sensitive element 150 will therefore, stabilize below its critical temperature.

One skilled in the art will appreciate, that various means are available to adjust the resistive element 110 to proportionately track the increase in the heat generated by the heat sensitive element. Adjusting the voltage of battery 100, adjusting the current supplied to resistive element 110, and adjusting the value of the resistive element 110 are a few means by which the heat source/resistive element 110 may be adjusted. It is understood that the output of temperature sensing element 120 may feed a plurality of control circuits, which in turn control a plurality of cooling elements. In another embodiment, the output of the sensor 170 may be input into a microprocessor based thermal management system to control one or more thermal control elements, wherein the thermal control elements could be either a heating element or a cooling element or a combination thereof.

If a thermal conductor is used to separate the resistive element from the temperature sensing element, adjusting the thermal conductor's material and dimensions can also affect the ability of the temperature sensing element to track the heat generated by the heat sensitive element. One skilled in the art will realize that any number of materials may be used as the thermal conductor, including but not limited to silicon, aluminum nitride, aluminum etc. Although, the embodiment describes a single space cooling element, one skilled in the art will appreciate that any number of space cooling elements may be employed. For instance, if it is necessary to maintain the temperature of more than one heat sensitive element, then multiple space cooling elements may be employed, each being coupled to one or more sensors 170.

In an alternate embodiment, resistive element 110 and temperature sensing element 120 may be designed on an application specific integrated circuit (ASIC). The ASIC may incorporate circuitry including but not limited to signal processing circuits for reading the output of the sensor 170, and for filtering the same if necessary, control circuits for feedback control and for controlling the rate at which fluid is moved past the heat sensitive element, drive circuits for providing the power needed to operate one or more space cooling elements, programming circuits, threshold circuits for using the device as a set-point controller, time multiplex circuits for making specialized measurements such as for obtaining mass flow rates or ambient temperature readings, and switching circuits. The switching circuits being used to control the application of power to one or more elements within the ASIC.

Thus a method and apparatus has been described to measure the cooling efficacy of a fluid and, in particular, the cooling efficacy of air. The apparatus described is very sensitive to changes in ambient temperature and mass flow rate and can detect anomalies such as a blocked vent in a projector almost instantly. Similarly, the apparatus described can detect a stalled or inoperative fan, eliminating the need for three wire fans. By detecting a blocked vent or a stalled fan in devices wherein vents and fans are needed to expel heat to the surrounding environment, the described apparatus reduces the risk of fires, and other forms of thermal damage. The described apparatus also allows for the maintenance of a tighter thermal control loop which may allow a cooling fan in an electronic apparatus to run at lower and hence quieter speeds.

What is claimed is:

1. An method comprising:
   coupling a heat source to a temperature sensing element; and
   adjusting the heat source so that the temperature of the heat source indicated by the temperature sensing element is nearly proportional to the temperature of a locally disposed heat sensitive component for changes in environmental parameters, wherein the temperature indicated by the temperature sensing element stabilizes before the temperature of the heat sensitive element stabilizes.

2. The method of claim 1, wherein coupling a heat source to a temperature sensing element comprises a resistive element locally disposed to the temperature sensing element wherein the resistive element and the temperature sensing element are separated by a thermal conductor.

3. The method of claim 1, wherein the changes in environmental parameters comprises a change in air density.

4. The method of claim 1, wherein adjusting the heat source comprises adjusting a voltage across the heat source.

5. The method of claim 1 wherein the heat sensitive component comprises at least one of a lamp, a motor hub, motor windings, a touchable surface and an optical device.

6. The method of claim 1 wherein the heat sensitive component is not mounted on a heat sink.

7. The method of claim 1, wherein the changes in environmental parameters comprises a change in air temperature.

8. The method of claim 1, wherein the changes in environmental parameters comprises a change in air humidity.

9. The method of claim 1, wherein the changes in environmental parameters comprises a change in air flow rate.

10. The method of claim 1 wherein the heat sensitive electrical component comprises a motor hub.

11. The method of claim 1 wherein the heat sensitive electrical component comprises motor windings.

12. The method of claim 1 wherein the heat sensitive electrical component comprises an optical device.

13. An apparatus comprising:
    a heat source coupled to a temperature sensing element; and
    the heat source adjusted so that the temperature of the heat source indicated by the temperature sensing element is nearly proportional to the temperature of a locally disposed heat sensitive component for changes in environmental parameters, wherein the temperature indicated by the temperature sensing element stabilizes before the temperature of the heat sensitive element stabilizes.

14. The apparatus of claim 13, wherein a heat source coupled to a temperature sensing element comprises a resistive element locally disposed to the temperature sensing element wherein the resistive element and the temperature sensing element are separated by a thermal conductor.

15. The apparatus of claim 13, wherein the heat source adjusted comprises adjusting a voltage across the heat source.

16. The apparatus of claim 13 wherein the heat sensitive component is a passive electrical component comprising at least one of a lamp, a motor hub, motor windings, a touchable surface and an optical device.

17. The apparatus of claim 13 wherein the heat sensitive component is not mounted on a heat sink.

18. The apparatus of claim 13, wherein the changes in environmental parameters comprises a change in air temperature.

19. The apparatus of claim 13, wherein the changes in environmental parameters comprises a change in air humidity.

20. The apparatus of claim 13, wherein the changes in environmental parameters comprises a change in air flow rate.

21. The apparatus of claim 13 wherein the heat sensitive electrical component comprises a motor hub.

22. The apparatus of claim 13 wherein the heat sensitive electrical component comprises motor windings.

23. The apparatus of claim 13 wherein the heat sensitive electrical component comprises an optical device.

24. The apparatus of claim 13, wherein the changes in environmental parameters comprises a change in air density.

25. An apparatus comprising:
a control circuit;
a heat source;
a temperature sensing element coupled to the heat source and the control circuit to provide input to the control circuit based on temperature of the heat source;
a space cooling element coupled to the control circuit, the space cooling element regulation based on a signal from the control circuit; and
a heat sensitive element locally disposed to the space cooling element, the space cooling element regulating the temperature of the heat sensitive element in response to output provided by the control circuit, wherein the temperature indicated by the temperature sensing element stabilizes before the temperature of the heat sensitive element.

26. The apparatus of claim 25, wherein the space cooling element comprises a heat pump.

27. The apparatus of claim 25, wherein a temperature sensing element coupled to a heat source comprises a temperature sensing element locally disposed to a resistive element wherein the resistive element and the temperature sensing element are separated by a thermal conductor.

28. The apparatus of claim 25, wherein the control circuit causes the space cooling element to maintain the temperature of the heat sensitive element below the critical temperature of the heat sensitive element.

29. The apparatus of claim 25, wherein the space cooling element comprises fan.

30. The apparatus of claim 25 wherein the heat sensitive element comprises at least one of a lamp, a motor hub, motor windings, a touchable surface and an optical device.

31. The apparatus of claim 25 wherein the heat sensitive element is not mounted on a heat sink.

32. The apparatus of claim 25, wherein the space cooling element comprises a heat exchanger.

33. The apparatus of claim 25, wherein the space cooling element comprises a thermoelectric cooler.

34. A method comprising:
coupling a temperature sensing element to a heat source and a control circuit;
providing input to the control circuit based on the temperature of the heat source;
coupling a space cooling element to the control circuit;
regulating the space cooling element by a signal from the control circuit; and
regulating the temperature of a heat sensitive element, locally disposed to the space cooling element, in response to output provided by the control circuit, wherein the temperature indicated by the temperature sensing element stabilizes before the temperature of the heat sensitive element stabilizes.

35. The method of claim 34, wherein the space cooling element comprises a thermo-electric cooler.

36. The method of claim 34, wherein coupling a temperature sensing element to a heat source comprises a resistive element locally disposed to the temperature sensing element wherein the resistive element and the temperature sensing element are separated by a thermal conductor.

37. The method of claim 34, wherein the space cooling element consists of an element selected from a group consisting of a fan a blower, a heat pump, a coolant pump, a heat exchanger, and a thermo-electric cooler.

38. The method of claim 34, wherein the space cooling element comprises a blower.

39. The method of claim 34, wherein the space cooling element comprises a heat pump.

40. The method of claim 34, wherein the space cooling element comprises a heat exchanger.

41. An apparatus comprising:
a heat source coupled to a temperature sensing element;
the heat source adjusted so that the temperature of the heat source, indicated by the temperature sensing element, is proportional to the temperature of a locally disposed heat sensitive electrical component; and
a cooling element is disposed between the temperature sensing element and the heat sensitive electrical component.

42. The apparatus of claim 41 further comprising a control circuit coupled to the temperature sensing element and to a cooling element, said cooling element to maintain the temperature of the locally disposed heat sensitive electrical component.

43. The apparatus of claim 41 wherein the heat sensitive electrical component comprises a lamp.

44. The apparatus of claim 43 wherein the lamp is a projector lamp.

45. The apparatus of claim 41 wherein the heat sensitive electrical component is not mounted on a heat sink.

46. The apparatus of claim 41 wherein the heat source is coupled to the temperature sensing element by a conductor.

47. The apparatus of claim 41 wherein the heat source is in contact with the temperature sensing element.

48. The apparatus of claim 41 wherein the heat source is a resistor connected to a voltage source.

49. The apparatus of claim 41 wherein the heat sensitive electrical component comprises a motor hub.

50. The apparatus of claim 41 wherein the heat sensitive electrical component comprises motor windings.

51. The apparatus of claim 41 wherein the heat sensitive electrical component comprises an optical device.

52. The apparatus of claim 25, wherein the space cooling element comprises a blower.

* * * * *